April 19, 1966     S. BRIGNOLI     3,246,502
SPEED HAMMER SWAGGING MACHINE
Filed Nov. 19, 1962     2 Sheets-Sheet 1
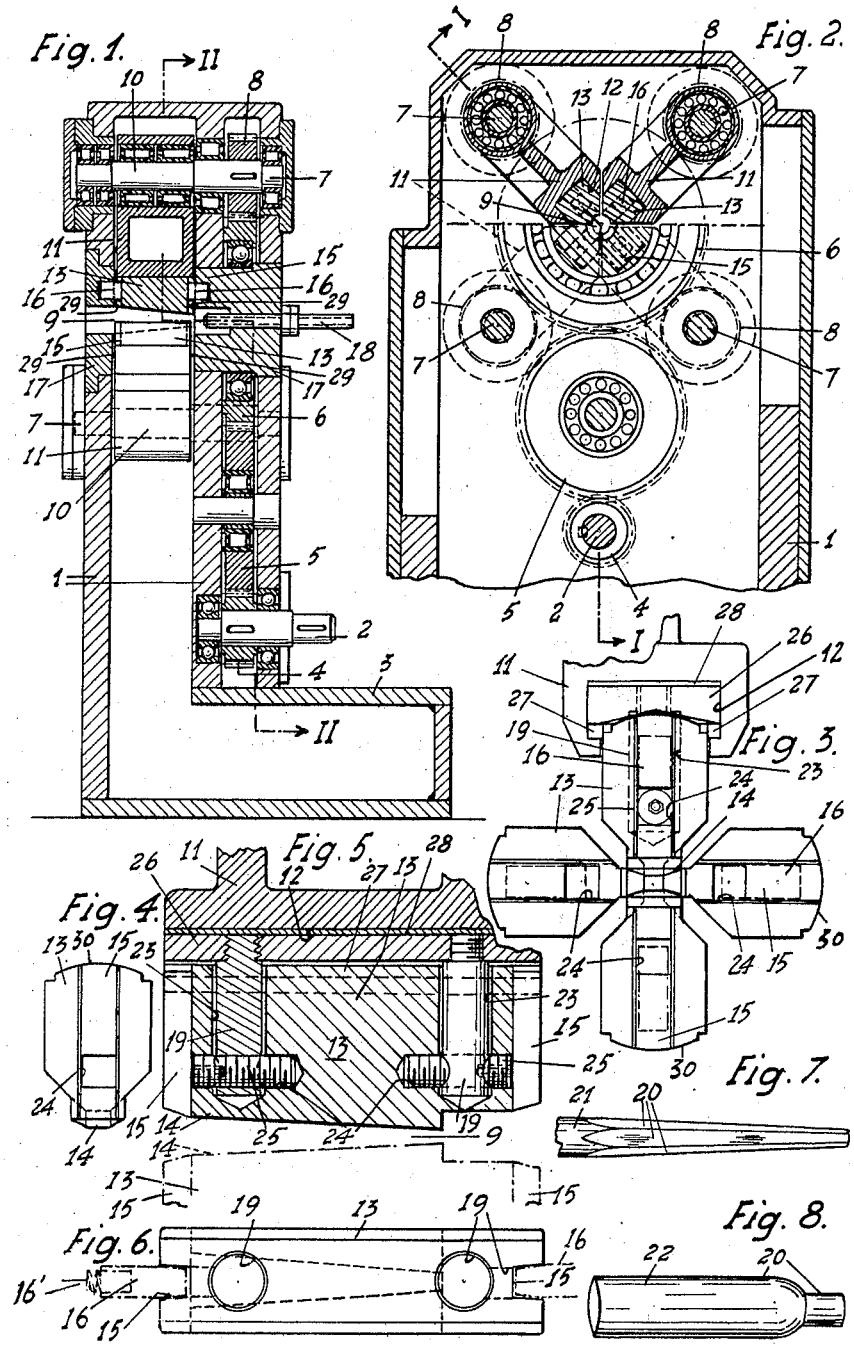
INVENTOR:
SILVIO BRIGNOLI
By: Otto John Munz
Attorney

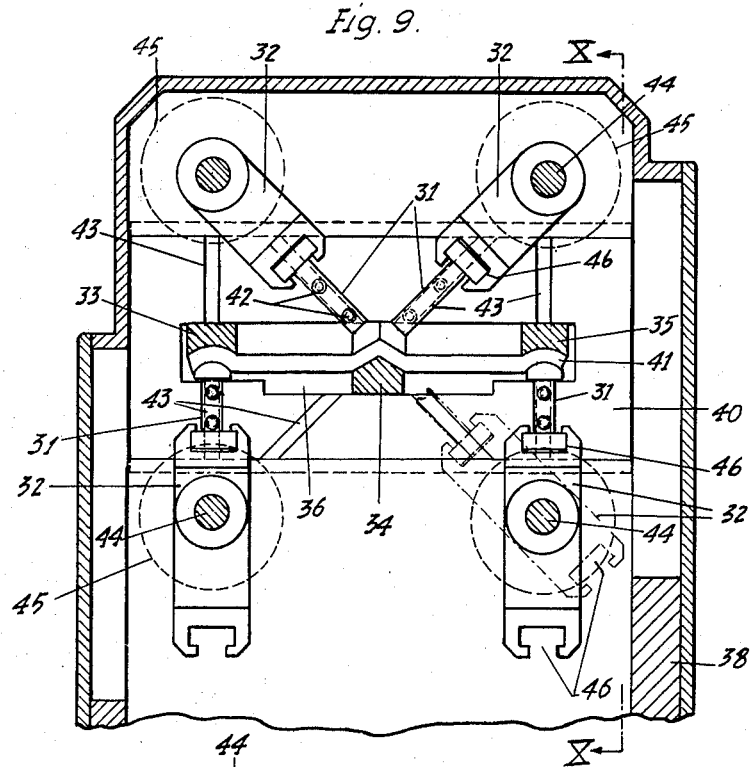
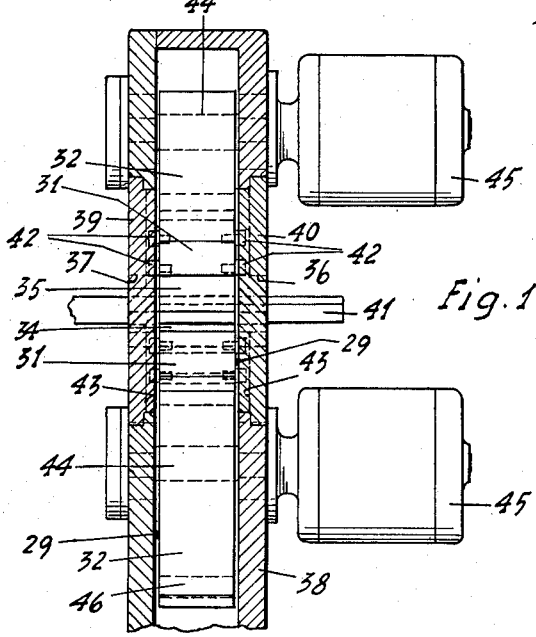

United States Patent Office 3,246,502
Patented Apr. 19, 1966

3,246,502
SPEED HAMMER SWAGING MACHINE
Silvio Brignoli, Dietikon, Kanton Zurich, Switzerland
Filed Nov. 19, 1962, Ser. No. 238,594
10 Claims. (Cl. 72—400)

The present invention relates to a speed-hammer and swaging and forging apparatus and more particularly to such an apparatus which is capable of reshaping solid and hollow materials into a desired configuration, as well as reducing them and providing the finished product with tapered, pointed or otherwise shaped ends.

Speed-hammer swaging machines have been known heretofore with exchangeable dies which may be inserted into hammers which driven by eccentric members which dies act on the work piece. The prior hammers have caused a great deal of noise, the drives of such prior devices have been very complex and they have often failed to produce a clean and accurate output of work pieces. The dies of these machines have been entirely enclosed so that scale tinder, chips and other excess metal produced by the swaging operation cannot readily escape between the die and the housing or the guide members associated therewith. Thus the closed guide members have sometimes become clogged and the apparatus has been subject to great wear and tear. In order to remove this product of the swaging and forging operation it has been necessary to provide a forced rinsing of the work piece so that the excess material may be removed from the work piece to provide a clean forging and to prevent detrimental effects to the apparatus. Such rinsing prevents the necessary warming up of the work piece to its working temperature. This has resulted in rough surfaces on the finished work pieces which also are often burred as a result of the combination of the rinsing operation and the cooling of the work piece.

It is an object of the present invention to provide a swaging and forging speed-hammer apparatus that eliminates the disadvantages heretofore encountered.

It is another object of the present invention to provide a swaging hammer apparatus in which the manners are disposed freely within the housing avoiding guiding and frictional engagement therewith, whereby to reduce wear on the apparatus.

Another object of the present invention is to provide a hammer capable of operating on angular work pieces, to taper shapes and to forge high precision flat and angular profiles, with uniform precision.

Another object of the present invention is to avoid production of scales and burrs on the finished work products and to provide clean and polished appearances to the surfaces.

It is another object of the present invention to provide an apparatus for swaging and working on a work piece wherein the drive means and all bearings are protected against the penetration of dirt thereby to reduce maintenance costs thereof without affecting optimum working conditions of the apparatus.

It is another object of the present invention to provide a hammer swaging and forging apparatus in which the dies may be readily changed to conform the shape of the work piece to that desired.

It is another object of the present invention to provide a cooling and cleaning arrangement for the apparatus of the present invention without producing deleterious effects on the hammer and die means embodied therein.

In accordance with the present invention speed-hammers are provided for swaging and forging devices in which reciprocating speed-hammers are disposed in the housing and spaced out of contact with any other surfaces therein other than the die means they operate so that there is no undue wear on the hammers.

The present invention also provides guide elements or members for the dies which are arranged on removable covers of the housing so that the dies may be readily removed and replaced with other dies for different forging and shaping operations.

The present invention also provides dies which are guided by slots and wedges which engage the slots in which the slots and wedges are arranged in the side surfaces of the dies and in the housing covers so that the dies may be quickly changed by a simple operation.

Another principal feature of this invention is the provision of an apparatus of the class described in which the hammers may operate in any desired predetermined direction by virtue of simple changes of tool guides.

A still further feature of this invention is the provision of a housing having two cover plates, one of which has a work receiving opening and the other of which has an exit opening provided with stop means for the end of a work piece.

An additional feature of this invention is the provision of means permitting the hammers all to operate simultaneously, or to operate hammers singly, in pairs or groups of alternately operating pairs.

Various other objects and advantages of the present invention will be readily apparent from the following detailed description when considered in connection with the accompanying drawings forming a part thereof and in which FIGURE 1 is a vertical cross-sectional view of an embodiment of the apparatus of the present invention taken along lines I—I of FIGURE 2;

FIGURE 2 is a fragmentary sectional view of the apparatus along the lines II—II of FIGURE 1;

FIGURE 3 is a front view of the dies in mutually operational positions;

FIGURE 4 is a front view of a die;

FIGURE 5 is an enlarged fragmentary section of the combination of a die with its respective hammer;

FIGURE 6 is a top plan view of a die;

FIGURE 7 is a plan view of a work piece made by the apparatus of the invention;

FIGURE 8 is a plan view of a different work piece made by the present apparatus;

FIGURE 9 is a fragmentary sectional view of another embodiment of the apparatus of the present invention; and FIGURE 10 is a fragmentary sectional view of the apparatus shown in FIGURE 9 along the lines X—X thereof.

The following list identifies the elements referred to hereinafter and the reference characters assigned thereto:

(1) Housing of welded armor plate.
(2) Main drive shaft.
(3) Power part of housing.
(4) Main drive gear, on shaft 2.
(5) Idler gears, meshing with gear 4.
(6) Large gear for driving hammers meshing with gear 5.
(7) Hammer shafts having eccentric portions.
(8) Gears fixed on shafts 7, symmetrically arranged.
(9) Central space for work pieces.
(10) Eccentric portions of shafts 7.
(11) Hammers freely mounted on eccentrics 10.
(12) Die bearings in hammers.
(13) Exchangeable dies operated by hammers 11.
(14) Working face of dies.
(15) Guide slots in dies.

(16) Guide members for dies.
(16') Springs for guide members.
(17) Removable cover plates.
(18) Stop means to limit position of work piece.
(19) Suspension bolts for dies.
(20) The completed surfaces on the work pieces 21 or 22.
(21) Work piece.
(22) Work piece.
(23) Hole in die for suspension bolt.
(24) Square hole in die.
(25) Pin in square hole 23, to secure die to suspension bolt.
(26) Optional suspension rail in die bearing for suspension bolt.
(27) Shims for adjusting die to eliminate play.
(28) Same as 27.
(29) Space between dies and housing to accommodate scale, dirt and waste.
(30) Convex pressure surface of die.
(31) Dies in modified structure.
(32) Hammers in modified structure.
(33) Anvil.
(34) Anvil.
(35) Anvil.
(36) Entrance opening.
(37) Same as 36.
(38) Housing of machine.
(39) Removable cover in 38.
(40) Same as 39.
(41) Work piece.
(42) Guiding member.
(43) Guide slot.
(44) Eccentric shafts.
(45) Motors for driving eccentric shafts.
(46) Die bearings, certain hammers having two, and providing lever arms of different lengths.

Referring to the drawings, the housing 1 is formed of welded armor plate and is provided with a driving shaft 2 in the lower portion thereof driven by a suitable motor not shown. The shaft 2 is provided with a gear 4 which in turn meshes with and drives idler gear 5. Idler gear as best seen in FIGURES 1 and 2 meshes with and drives a large gear 6. Gear 6 is disposed concentrically and in alignment with the center of the operating space 9. The large gear 6 meshes with and drives gears 8 disposed 90° apart as shown in FIGURE 2 and arranged symmetrically thereabout so that all of the gears 8 are synchronized and driven by the gear 6 at the same rate of speed. The gears 8 are fixed on eccentric shafts 7 and the shafts of the gears 4, 5 and 6 are all provided with conventional anti-friction bearings as are the individual eccentric shafts 7. Each eccentric shaft 7 carries a reciprocating hammer 11 with the hammers being disposed inwardly of the gear wheels so as to reciprocate or move toward and away from the central axis of the space 9 as seen in FIGURE 2. The hammers are disposed on eccentric portion 10 of shafts 7 and are provided with conventional anti-friction bearings so that they are free to move without any guidance of their own toward and away from the central axis of the space 9 in the housing 1 with clearance on both sides thereof as clearly shown in FIGURE 1, thus avoiding any frictional engagement or contact with the housing. The strokes of the hammers depend on the size of the machine and on the work to be performed and may be from 0.5 millimeters to 6 mm. or other desired amount and the stroke may be changed by simple means as, for example, by arranging two eccentric bushings about the eccentrics 10 which may be reset from the outside of the housing. The inner ends of the hammers 11 are provided with die bearings 12 in which dies 13 are removably disposed. The dies 13 have on their opposite side faces longitudinal guide slots 15 in which guide members 16 operate to guide the dies 13 in a straight line as they move inwardly and outwardly relative to the central axis 9 of the operational space. Removable covers 17, as shown in FIGURE 1, are provided for the housing 1, one of which has an opening therein for introducing the work piece. The other cover 17 is provided with a stop 18 against which the work piece abuts when it is in a position to be forged. In lieu of the stop 18, the other cover 17 may be provided with an opening for removal of a finished work piece. The guide members 16 are mounted in the cover members 17 as seen in FIGURE 1, although they may also be provided in the dies as is indicated in FIGURE 10, in which case the longitudinal slots may be in the cover members.

The opposite faces of the dies 13 are spaced slightly from the cover plates 17 to provide a small open space registering with the open space on either side of the hammers 11 and through which scale, chips, burrs and other waste from the forging operation may fall. The guide means 16 may be forced toward the slots 15 by means of springs 16' as shown in FIGURE 6.

Suspension bolts 19 project into the dies 13 in openings 23 having square holes 24 transverse thereto. The bolts 19 are provided with pins 25 threaded through them which pins are positioned in the square holes 24 in order to secure the suspension of the dies 13 from bolt members 19. When the dies are of one piece only, the bolt members may be fixed in the hammers 11. In FIGURES 3 and 5, however, they are fixed in rails 26. The die hanging on the rail 26 is pushed from one side into the die bearing 12. Shims or spacers 27 and 28 are used to insure a correct positioning of the dies 13 without permitting any play in the direction of the stroke. The hanging bolt members 19 are preferably used when high precision work output is required. The drive system is sealed against penetration by dust and foreign matter and the anti-friction bearings are provided with suitable seal rings and the like. The hammers directed by the eccentric shaft portions 10 toward the dies which operate with a reciprocating motion in a straight line toward the operational center of the space 9. The reciprocating or vibrational motion of the hammers 11 as applied to the dies, reshapes the work piece introduced through the opening in the cover 17 between the dies in accordance with the particular shape of the die faces 14. The machine operates at 1,400 to 2,600 revolutions per minute of the eccentric shaft 7, with a corresponding number of strokes of a hammer 11. Any desired number of hammers may be provided, and the hammers may be employed and they may be synchronized or they may be individually operated as desired. For example, if four hammers are used, two hammers may strike the work piece simultaneously and jointly while the opposing pair of hammers may strike the work piece at another time.

It is also possible to change the operation of the hammers 11 by changing the eccentricity of the portion 10 of the shaft 7 on which the hammers are mounted. Thus the hammers may be arranged all to operate jointly and simultaneously, or some may operate together while others operate separately and independently. The eccentrics can be so adjusted that two opposing dies operate in succession while two others operate jointly and simultaneously.

The dies shown in FIGURES 3–6 make it possible to achieve a polygonal reshaping with simultaneous pointing or tapering as especially shown in FIGURE 7 without any scale formation and the work output 21 and the surface 20 thereof have a clean, smooth and polished appearance, since scale and other impurities are flushed away from the operational area by the use of the fall through space 29 provided between both sides of the die member 13 between said die 13 and the cover member 17. The cover member 17 and the dies 13 and the guide members 16 may be exchanged within a few minutes and the speed-hammer swaging and forging apparatus of the present invention operates with a minimum of noise.

The dies 13 as shown in FIGURE 2 serve for shaping round or other work pieces into a circular cross section. The dies 13 shown in FIGURES 3 to 6 are for making polygonal shapes which may be tapered as for punches or tangs for files and other tools, and for other purposes. In all cases the precision of the work remains throughout the operation, and there is no scale or burr formation to mar the surfaces of the finished work piece. The products have clean, smooth and polished appearances, since scale, burrs and other waste are flushed away through the space 29. Pipes and bars having various configurations may be shaped, on the instant machine, in a short time, in lengths up to approximately 80 cm. It is feasible to provide a machine of this type capable of shaping work pieces of one meter or more in length.

The cooperating surfaces of the dies 13 and the die bearings 12 or the rails 26 are shaped in such a manner as to permit relative swinging motion of the hammer 11 and the die.

In accordance with the embodiment of the invention shown in FIGURES 9 and 10 there are provided four hammers 32 with dies 31, which do not operate jointly against one operational center, but against a plurality of different operational positions, namely, against anvils 33, 34 and 35. The anvils are exchangeably mounted, for instance by being bolted, in the entrance and exit openings 36 of the cover members 39 and 40 of housing 38. The two upper hammers 32 operate with their dies 31 against the anvils 34, at an angle to each other of 90° against the work piece 41 supported by the anvil 34. Both lower hammers 32 operate in a vertical direction one against the anvil 33 and the other against the anvil 35. Guide members 42 are removably mounted on the dies and project into guide slots 43 formed in the covers 39 and 40.

The drive of the eccentric shafts 44 may be the same as that for the shafts 7 in FIGURES 1 and 2. However, it is found convenient to drive the shafts by means of electric motors 45, which are preferably directly connected to the eccentric shafts 44. Synchronization of the eccentric shafts 44 is not normally required. When the strokes, however, are directed against a common operational center synchronization becomes necessary. In order to permit a quick change to synchronized hammering from alternate hammering, the hammers are set free through opening up the machine by removing the covers 39 and 40. It is also desirable to electrically synchronize the motors 45, so that it is possible to change from alternative to synchronized hammering immediately. It is of course feasible to select the desired manner of hammering with mechanical drive systems and synchronization of gears, by changing the gears with different settings of eccentricity. Complex dismantling would be required, however, to accomplish the purpose mechanically and would entail an unnecessary waste of time.

When round work pieces are to be forged it is preferable to employ simultaneous hammering, while when a four-cornered, six-cornered or other polygonal cross-sectional shape is required, the alternative hammering operates more advantageously. When the hammering occurs against the anvils no synchronization is required.

When the speed-hammer forging machine is employed in accordance with the present invention there is no need for a forced jet rinsing of the dies which results in a reduction of heat bringing the temperature below the working temperature of 400 to 600 degrees centigrade. It is obvious that the dies of the machine of the present invention must be cooled after the work is completed. During the forging operation, only the opposite side walls are rinsed with a coolant, but not the dies themselves. In order to cool the dies before they are exchanged a control valve must be opened completely. In such an instance the coolant stream shoots over protective plates, not shown, which are arranged in such a manner to direct the coolant toward the dies.

The apparatus in accordance with FIGURE 9 may have hammers 32 which have die bearings 46 strokes at each end forming lever arms of different lengths. The lower hammers 32 may be swung over and the dies 31 may be pushed into the die bearings 46 of the longer arms as shown in dotted lines in FIGURE 9. By this operation it is possible to avoid replacement of the lower hammers 32.

In order to make it possible to forge exceptionally difficult profiles in the operation of the machine, six or more hammers may be coarranged. When six hammers are not further required, they may be arranged in such a manner as to provide two operational positions in the apparatus, which operate each with three hammers or three operational positions each with two hammers. It is also feasible to let each individual hammer strike a respective anvil whereby six operational positions are provided. This is preferable in many cases, primarily when small strokes are to be employed and the apparatus would otherwise have to be changed.

The electric synchronizing of the motors 45 makes it a simple matter to connect together the desired motors and shift in or shift out, as is most desirable with respect to the work on hand.

The machine according to FIGURE 9 makes it possible to provide for a universal operation thereof. This machine may be used to forge widely different types of profiles, such as double T shapes, U shapes, ovals, and so on. In addition, entirely assymetrical forms and plates of desired thickness may be forged as desired into desired shapes, such as shafts, U shapes, zig-zag shapes, and the like.

In as much as changes may be made in the form, location and relative arrangement of the several parts of the invention without departing from the principle of the invention, it will be understood that the invention is not to be limited except by the scope of the appended claims.

What is claimed is:

1. A speed-hammer swaging machine comprising a housing having front and rear walls, one wall having an opening for positioning a work piece thereon, a drive shaft, a plurality of hammer shafts, each having an eccentric portion, a hammer mounted on each said eccentric portion for reciprocation thereby, dies detachably connected to the hammers, for striking a work piece inserted through said opening into said housing, said hammers and said dies being spaced from said walls to eliminate frictional contact therewith, and guide means for said dies constraining them to move in a straight line path and oriented to guide the dies toward and away from the work with no lateral component of motion.

2. The machine of claim 1 wherein said guide means comprise longitudinally extending guide slots in the dies and guide members projecting into said guide slots on opposite sides of said dies.

3. The machine of claim 2 wherein the front and rear walls of said housing are provided with removable cover members and wherein said guide members are mounted in said cover members.

4. The machine of claim 3 wherein is provided in one of said cover members the opening and wherein the other cover member is provided with a stop member for contacting a work piece.

5. The machine of claim 1 wherein said hammers are provided with die bearings and including shim means disposed within said bearings to connect the dies to said hammer means.

6. A speed-hammer swaging machine comprising a housing, anvils in said housing, hammers with dies detachably connected thereto for striking toward said anvils, eccentric drive means operatively connected to said hammers for reciprocating them toward and away from said anvils, guide means for said hammers and dies connected to said dies and spaced from said hammers, spaces formed between said hammer means and the surfaces of said housing to permit free reciprocating movement of the hammer means in said housing to minimize friction and wear.

7. The machine of claim 6 wherein said guide means comprise guide slots formed in the housing and guide members mounted on opposite sides of the dies projecting into said guide slots.

8. The machine of claim 7 wherein said guide slots are disposed in said housing in different directions therein and said guide members are connected to be disposed in selected guide slots.

9. The machine of claim 8 wherein said hammers are swingably disposed in said housing with respect to said anvils to strike the anvils, said anvils each having a selected angle.

10. A swaging machine comprising a frame, a plurality of hammers mounted in the frame for reciprocating movement along individual paths only some of which intersect at a common point, anvil means individual to each hammer mounted in the path of movement of each hammer and means for reciprocating the hammers.

References Cited by the Examiner

UNITED STATES PATENTS

| | | | |
|---|---|---|---|
| 492,673 | 2/1893 | Dayton | 78—22 |
| 2,460,490 | 2/1949 | Cook | 78—21 |
| 2,562,642 | 7/1951 | Saxer | 78—21 |
| 2,562,643 | 7/1951 | Saxer | 78—22 |
| 2,617,319 | 11/1952 | Richards | 78—21 |
| 2,903,923 | 9/1959 | Kralowetz | 78—20 |
| 3,064,508 | 11/1962 | Smith | 78—22 |

FOREIGN PATENTS

| | | |
|---|---|---|
| 576,003 | 5/1959 | Canada. |
| 636,761 | 2/1962 | Canada. |
| 1,148,577 | 12/1957 | France. |
| 1,223,694 | 6/1960 | France. |
| 473,241 | 10/1937 | Great Britain. |
| 681,986 | 11/1952 | Great Britain. |

CHARLES W. LANHAM, *Primary Examiner.*
WILLIAM STEPHENSON, *Examiner.*
G. P. CROSBY, *Assistant Examiner.*